(12) United States Patent
Hu

(10) Patent No.: US 12,304,189 B2
(45) Date of Patent: May 20, 2025

(54) DISPLAY MODULE AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Xiaojing Hu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,972

(22) PCT Filed: Jun. 29, 2022

(86) PCT No.: PCT/CN2022/102343
§ 371 (c)(1),
(2) Date: Jul. 17, 2022

(87) PCT Pub. No.: WO2023/240694
PCT Pub. Date: Dec. 21, 2023

(65) Prior Publication Data
US 2024/0173940 A1 May 30, 2024

(30) Foreign Application Priority Data
Jun. 17, 2022 (CN) .......................... 202210691870.2

(51) Int. Cl.
*B32B 7/12* (2006.01)
*B32B 15/04* (2006.01)
*B32B 27/06* (2006.01)

(52) U.S. Cl.
CPC ................ *B32B 7/12* (2013.01); *B32B 15/04* (2013.01); *B32B 27/06* (2013.01); *B32B 2307/4023* (2013.01); *B32B 2307/42* (2013.01); *B32B 2307/7376* (2023.05); *B32B 2457/20* (2013.01)

(58) Field of Classification Search
CPC ........................ B32B 2307/42; B32B 2457/20
See application file for complete search history.

(56) References Cited

FOREIGN PATENT DOCUMENTS

CN 113035059 * 6/2021

* cited by examiner

*Primary Examiner* — Elizabeth E Mulvaney
(74) *Attorney, Agent, or Firm* — PV IP PC; Wei Te Chung

(57) ABSTRACT

The present application provides a display module and a display device. The display module includes a display panel, a self-adhesive back plate disposed on the display panel, and a support plate disposed on the self-adhesive back plate. The self-adhesive back plate includes at least two adhesive layers, one of the at least two adhesive layers is disposed facing the display panel, and another one of the at least two adhesive layers is disposed facing the support plate. In the present application, by disposing the self-adhesive back plate and the support plate to support the display panel, a thickness of the display module can be greatly reduced, and difficulty and cost of production can be reduced.

20 Claims, 2 Drawing Sheets

DISPLAY MODULE AND DISPLAY DEVICE

BACKGROUND OF INVENTION

Field of Invention

The present application relates to a field of display equipment, and particularly to a display module and a display device

Description of Prior Art

With iterative updates of display screen technology, simplification of structures and cost reduction of display modules are key directions of development nowadays. At present, a super clean foam (SCF) module is generally disposed in common fixed-curved surface module structures in market. The SCF module is a type of composite layer composed of multi-layer film layers such as a heat dissipation layer, a support layer, a foam layer, a light-shielding layer, a release film, and a protective layer, etc. Each manufacturing process such as type selection of materials of each layer, attaching of layers, and trimming of layers of the SCF module will affect display effect of final screens and seriously affect yield of final products. Therefore, in order to reduce impact of a complex structure of the SCF module on yield of a display module, design, material preparation, and manufacturing of a panel are very cumbersome, which not only increase difficulty of the manufacturing processes, but also keep production cost high.

SUMMARY OF INVENTION

A purpose of the present application is to provide a display module and a display device, which can solve technical problems of a cumbersome film layer structure, a complex manufacturing process, and high production cost of a support structure of a display panel in the prior art.

To achieve the above purpose, the present application provides the display module, the display module includes a display panel, a self-adhesive back plate, and a support plate. The self-adhesive back plate is disposed on a back surface of the display panel. The support plate is disposed on a surface of the self-adhesive back plate away from the display panel. Wherein the self-adhesive back plate includes at least two adhesive layers, one of the at least two adhesive layers is disposed facing the display panel, and another one of the at least two adhesive layers is disposed facing the support plate.

Further, the self-adhesive back plate includes a flexible support layer, a first adhesive layer, and a second adhesive layer. The first adhesive layer is disposed on a surface of the flexible support layer facing the display panel. The second adhesive layer is disposed on a surface of the flexible support layer facing the support plate.

Further, a material of the flexible support layer includes at least one of thermoplastic polyester, polyimide, and cycloolefin polymer. A material of the first adhesive layer and a material of the second adhesive layer both include a pressure-sensitive adhesive material.

Further, the material of the second adhesive layer further includes a light-shielding material.

Further, the thermoplastic polyester is polyethylene terephthalate.

Further, the display module further includes a light-shielding layer, the light-shielding layer is disposed on a surface of the support plate facing the self-adhesive back plate.

Further, a material of the light-shielding layer includes black toner particles.

Further, a material of the support plate includes at least one type of metals. The metals include at least one of aluminum, titanium, nickel, iron, and copper.

Further, a thickness of the support plate ranges from 300 microns to 150 microns.

Further, the display module further includes a polarizer and a cover plate. The polarizer is disposed on a surface of the display panel away from the self-adhesive back plate. The cover plate is disposed on a surface of the polarizer away from the display panel.

Further, the present application further provides a display device, the display device includes the display module as described above.

Advantages of the present application are: in the display module and the display device provided by the present application, by disposing the self-adhesive back plate and a support plate to support the display panel, a SCF module in the prior art can be removed, which simplifies a structure of the display module and greatly reduces a thickness of the display module. At a same time, it also reduces a manufacturing process and manufacturing difficulty of the display module, thereby improving production efficiency and reducing production cost.

BRIEF DESCRIPTION OF DRAWINGS

In order to more clearly explain technical solutions in embodiments of the present application, following will briefly introduce drawings that need to be used in description of the embodiments. It is obvious that the drawings in the following description are only some embodiments of the present application. For those skilled in the art, other drawings can be obtained from these drawings without creative work.

DESCRIPTION OF REFERENCE MARKS

Figure 1:
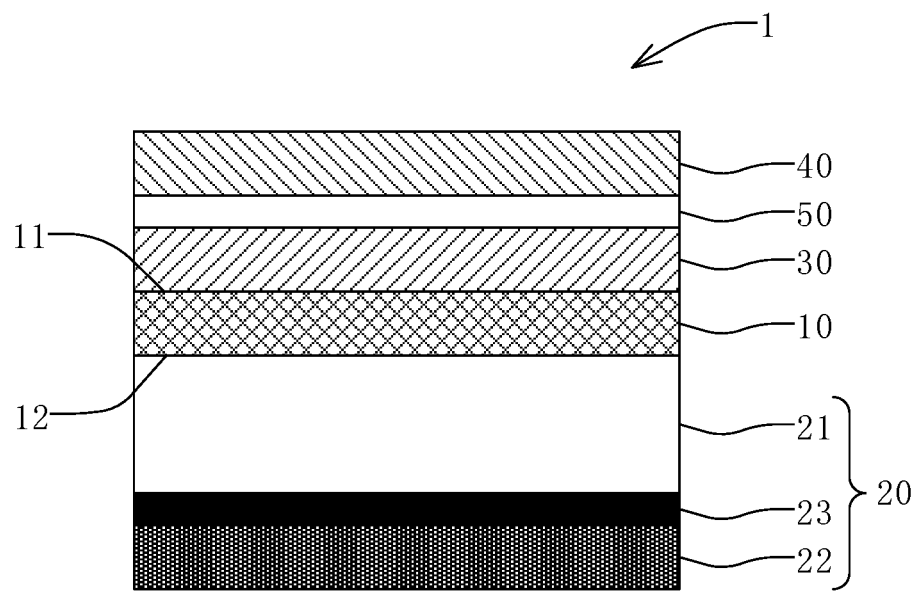
FIG. 1 is a schematic structural diagram of a display module in embodiment 1 of the present application.

Display module 1; display panel 10; display surface 11; back surface 12; support structure 20; self-adhesive back plate 21; first adhesive layer 211; flexible support layer 212; second adhesive layer 213; support plate 22; light-shielding layer 23; polarizer 30; cover plate 40; photosensitive adhesive layer 50.

DETAILED DESCRIPTION OF EMBODIMENTS

Following describes preferred embodiments of the present application with reference to attached drawings of the description, which proves that the present application can be implemented. The embodiments of can be completely introduced in the present application to those skilled in the art, making it more clearly and easily to understand technical contents. The present application can be embodied in many different forms of embodiments, and a scope of protection of the present application is not limited to the embodiments mentioned herein.

In the drawings, components with same structure are represented by same numerical labels, and components with similar structures or functions are represented by similar numerical labels. A size and a thickness of each component shown in the drawings are arbitrarily shown, and the present application does not limit the size and thickness of each component. In order to make diagrams more clear, the thickness of the component is appropriately exaggerated at some position in the drawings.

In addition, following description of each embodiment of refers to additional illustrations to illustrate specific embodiments that the present application can be implemented. Directional terms mentioned in the present application, such as "up", "down", "front", "back", "left", "right", "inside", "outside", and "side", etc., only refer to directions of additional schemas. Therefore, directional terms used are for better and clearer explanation and understanding of the present application, rather than indicating or implying that devices or elements must have a specific orientation, be constructed and operated in a specific orientation, Therefore, it cannot be understood as a restriction to the present application. In addition, terms "first", "second", "third", and the like are used only for descriptive purposes and cannot be understood as indicating or implying relative importance.

When some components are described as "on another component", the components can be directly placed on another component; there may also be an intermediate component, and the components are placed on the intermediate component, and the intermediate component is placed on another component. When a component is described as "installed to" or "connected to" another component, both can be understood as "installed" or "connected" directly, or a component is indirectly "installed to" or "connected to" another component through an intermediate component.

Embodiment 1

An embodiment of the present application provides a display device. The display device is a fixed-curved surface display device, which includes a display module 1. As shown in FIG. 1, the display module 1 includes a display panel 10, a support structure 20, a polarizer 30, and a cover plate 40 disposed in a stack. The display device can be any display devices with display functions, such as a mobile phone, a notebook computer, and a tablet computer, etc.

The display panel 10 is a flexible display panel 10, which can realize curved-surface display. The display panel 10 includes a display surface 11, and a back surface 12 disposed opposite to the display surface 11. Wherein the display surface 11 is a surface on which the display panel 10 displays an image.

The support structure 20 is a fixed-curved surface support structure 20, which is used to fix a surface curvature of the display panel 10 to achieve curved-surface screen display. As shown in FIG. 1, the support structure 20 includes a self-adhesive back plate 21 and a support plate 22 sequentially disposed in a stack.

Figure 2:
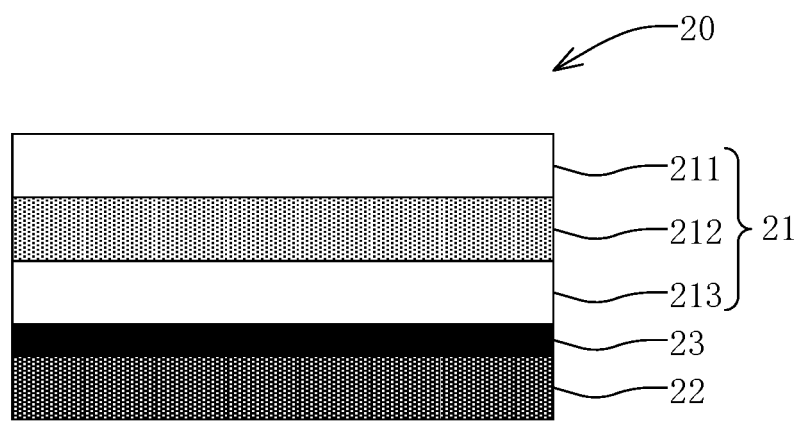
FIG. 2 is a schematic structural diagram of a support structure in embodiment 1 of the present application.

The self-adhesive back plate 21 is attached to the back surface 12 of the display panel 10. As shown in FIG. 2, the self-adhesive back plate 21 includes a first adhesive layer 211, a second adhesive layer 213, and a flexible support layer 212.

The flexible support layer 212 is disposed between the support plate 22 and the display panel 10, and is used to flexibly support the display panel 10. At a same time, the flexible support layer 212 can buffer and protect the display panel 10 through its flexible characteristics, so as to reduce a risk of fragmentation of the display panel 10 during transportation. Specifically, a preparation material of the flexible support layer 212 can be one or more of thermoplastic polyester, polyimide (PI), and cycloolefin polymer (COP). Preferably, the thermoplastic polyester can be polyethylene terephthalate (PET).

The first adhesive layer 211 is disposed on a surface of the flexible support layer 212 facing the display panel 10, and is used to adhere the flexible support layer 212 on the back surface 12 of the display panel 10.

The second adhesive layer 213 is disposed on a surface of the flexible support layer 212 facing the support plate 22, and is used to adhere the support plate 22 on a surface of the flexible support layer 212 away from the display panel 10.

Wherein the first adhesive layer 211 and the second adhesive layer 213 are both transparent adhesive layers made of pressure-sensitive adhesive materials, which can be prepared on an upper surface and a lower surface of the flexible support layer 212 through a liquid coating process, respectively. After a liquid first adhesive layer 211 and a liquid second adhesive layer 213 are cured, the liquid first adhesive layer 211 and the liquid second adhesive layer 213 form an integrated self-adhesive back plate 21 with the flexible support layer 212. The self-adhesive back plate 21 can be directly aligned with and adhered to the display panel 10 and the support plate 22, respectively, which can simplify an adhesion structure of the existing support structure 20 and reduce a number of alignment and attachment.

The support plate 22 is attached to the surface of the flexible support layer 212 through the second adhesive layer 213. The support plate 22 is a hard support plate 22 with a thickness ranging from 30 microns to 150 microns, and a preparation material of the support plate 22 is one or more of metals or alloys with excellent thermal conductivity, such as aluminum, titanium, nickel, iron, copper, and other metals. The support plate 22 is mainly used to provide hard support for a flexible curved-surface display panel 10 and to fix the surface curvature, so as to maintain curved-surface characteristic of the display panel 10. At a same time, the support plate 22 can also improve heat dissipation efficiency of the display module 1 through characteristics of the metal materials, which can even out a temperature of the display module 1, prevent thermal damage, and provide electromagnetic shielding for the display panel 10 to prevent external electromagnetic signals from affecting an operation of the display panel 10.

Further, the support structure 20 also includes a light-shielding layer 23. The light-shielding layer 23 is used to shield light, so as to prevent a problem of uneven light output of light emitted by the display panel 10 caused by refraction on the metal support plate 22, and at a same time, it can also prevent external light from entering from the back surface 12 of the display module 1 and affecting display effect. Specifically, a material of the light-shielding layer 23 includes a black light-shielding material, such as black toner particles, which can be prepared on a surface of the support structure 20 facing the self-adhesive back plate 21 by coating, 3D inkjet printing, and other processes.

As shown in FIG. 1, the polarizer 30 is disposed on the display surface 11 of the display panel 10, and is used to change polarization state of light, thereby realizing passing and blocking of light, so as to eliminate ambient light entering the display module 1, thereby improving display contrast of the display module 1.

The cover plate 40 is disposed on a surface of the polarizer 30 away from the display panel 10, and is used to protect the display surface 11 of the display module 1.

Further, a photosensitive adhesive layer 50 can be coated between the polarizer 30 and the cover plate 40 to fix the cover plate 40 on a surface of the polarizer 30.

In the display module 1 provided by the embodiment of the present application, by integrating the flexible support layer 212 and adhesive layers to form the self-adhesive back plate 21 with self-adhesive function, attachment and fixation of the self-adhesive back plate 21 with the display panel 10 and the support plate 22 can be realized, and at a same time, the adhesion structure of the support structure 20 can be simplified. Moreover, in the embodiment of the present application, a single-layer support plate 22 made of a metal material is also used to replace the SCF module with multi-layer film layers in the prior art, on a premise that a support function and a heat dissipation function of the support structure 20 are not affected, an overall structure of the support structure 20 is simplified, and an overall thickness of the display module 1 is reduced, which can realize portability and save cumbersome preparation procedures and die-cutting cost of existing SCF module at a same time, thereby greatly reducing preparation difficulty of the support structure 20 and improving production efficiency, so as to reduce production cost of the display module 1.

Embodiment 2

Figure 3:
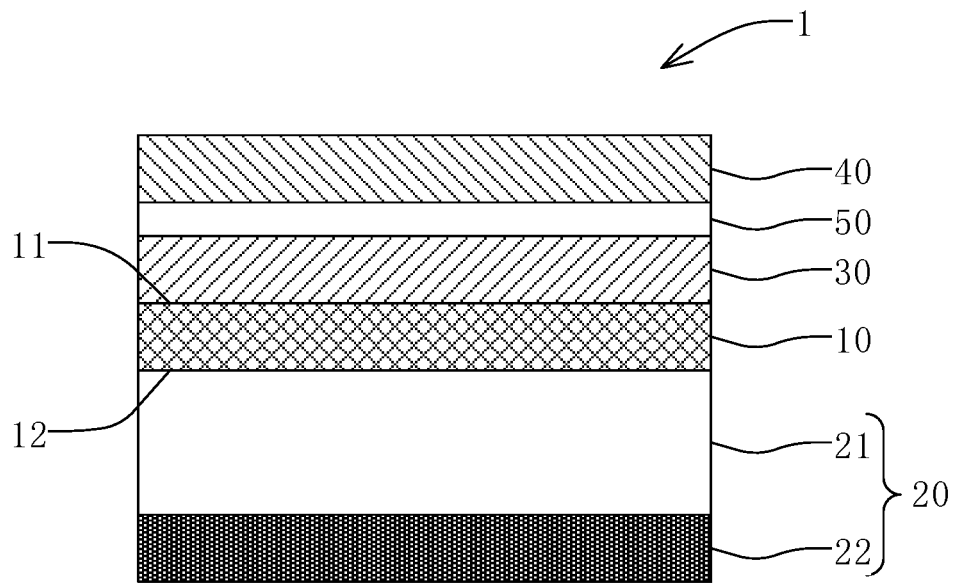
FIG. 3 is a schematic structural diagram of a display module in embodiment 2 of the present application.

An embodiment provides a display module 1, as shown in FIG. 3. The display module 1 includes a display panel 10, a support structure 20, a polarizer 30, and a cover plate 40 disposed in a stack.

The display panel 10 is a flexible display panel 10, which can realize curved-surface display. The display panel 10 includes a display surface 11 and a back surface 12 disposed opposite to the display surface 11. Wherein the display surface 11 is a surface on which the display panel 10 displays an image.

Figure 4:
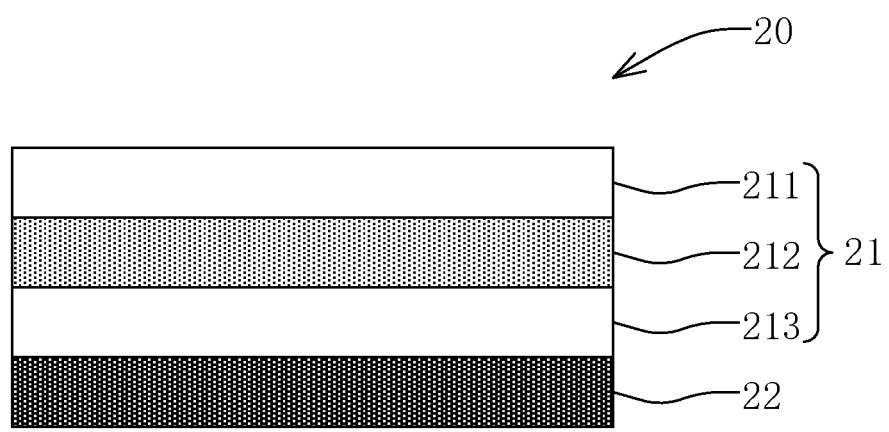
FIG. 4 is a schematic structural diagram of a support structure in embodiment 2 of the present application.

The support structure 20 is a fixed-curved surface support structure 20, which is used to fix a surface curvature of the display panel 10 to achieve curved-surface screen display. As shown in FIG. 4, the support structure 20 includes a self-adhesive back plate 21 and a support plate 22 sequentially disposed in a stack.

The self-adhesive back plate 21 is attached to the back surface 12 of the display panel 10. As shown in FIG. 4, the self-adhesive back plate 21 includes a first adhesive layer 211, a second adhesive layer 213, and a flexible support layer 212.

The flexible support layer 212 is disposed between the support plate 22 and the display panel 10, and is used to flexibly support the display panel 10. At a same time, the flexible support layer 212 can buffer and protect the display panel 10 through its flexible characteristics, so as to reduce a risk of fragmentation of the display panel 10 during transportation. Specifically, a preparation material of the flexible support layer 212 can be one or more of thermoplastic polyester, polyimide (PI), and cycloolefin polymer (COP). Preferably, the thermoplastic polyester can be polyethylene terephthalate (PET).

The first adhesive layer 211 is disposed on a surface of the flexible support layer 212 facing the display panel 10, and is used to adhere the flexible support layer 212 on the back surface 12 of the display panel 10.

The second adhesive layer 213 is disposed on a surface of the flexible support layer 212 facing the support plate 22, and is used to adhere the support plate 22 on a surface of the flexible support layer 212 away from the display panel 10.

Wherein the first adhesive layer 211 is a transparent adhesive layer, the second adhesive layer 213 is a light-shielding adhesive layer, and the first adhesive layer 211 and the second adhesive layer 213 are both made of pressure-sensitive adhesive materials, which can be prepared on an upper surface and a lower surface of the flexible support layer 212 through a liquid coating process, respectively. After a liquid first adhesive layer 211 and a liquid second adhesive layer 213 are cured, the liquid first adhesive layer 211, the liquid second adhesive layer 213, and the flexible support layer 212 form an integrated self-adhesive back plate 21. The self-adhesive back plate 21 can be directly aligned with and adhered to the display panel 10 and the support plate 22, respectively, which can simplify an adhesion structure of the existing support structure 20 and reduce a number of alignment and attachment.

Further, a preparation material of the second adhesive layer 213 also includes a black light-shielding material, such as black toner particles, so that the second adhesive layer 213 can shield light, prevent a problem of uneven light output of light emitted by the display panel 10 caused by refraction on the metal support plate 22, and at a same time, it can also prevent external light from entering from the back surface 12 of the display module 1 and affecting display effect.

The support plate 22 is attached to the surface of the flexible support layer 212 through the second adhesive layer 213. The support plate 22 is a hard support plate 22 with a thickness ranging from 30 microns to 150 microns, and a preparation material of the support plate 22 is one or more of metals or alloys with excellent thermal conductivity, such as aluminum, titanium, nickel, iron, copper, and other metals. The support plate 22 is mainly used to provide hard support for a flexible curved-surface display panel 10 and to fix the surface curvature, so as to maintain curved-surface characteristic of the display panel 10. At a same time, the support plate 22 can also improve heat dissipation efficiency of the display module 1 through characteristics of the metal materials and provide electromagnetic shielding for the display panel 10 to prevent external electromagnetic signals from affecting an operation of the display panel 10.

As shown in FIG. 4, the polarizer 30 is disposed on the display surface 11 of the display panel 10, and is used to change polarization state of light, thereby realizing passing and blocking of light, so as to eliminate ambient light entering the display module 1, thereby improving display contrast of the display module 1.

The cover plate 40 is disposed on a surface of the polarizer 30 away from the display panel 10, and is used to protect the display surface 11 of the display module 1. Further, a photosensitive adhesive layer 50 can be coated between the polarizer 30 and the cover plate 40 to fix the cover plate 40 on a surface of the polarizer 30.

The embodiment of the present application is a best embodiment. Based on the display module in embodiment 1 of the present application, the light-shielding layer is removed from the display module provided by the embodiment of the present application, so as to further reduce the thickness of the display module. At a same time, it can also omit a manufacturing step of the light-shielding layer, further reducing a manufacturing process and improving production efficiency.

Although the present application is described herein with reference to specific embodiments, it should be understood that these embodiments are only examples of principles and applications of the present application. Therefore, it should be understood that many modifications can be made to exemplary embodiments, and other arrangements can be designed as long as they do not deviate from the spirit and a scope of the present application as defined in appended claims. It should be understood that different dependent claims and features described herein may be combined in a manner different from that described in the original claims. It is also understood that the features described in connection with individual embodiments may be used in other described embodiments.

What is claimed is:

1. A display module comprising:
a display panel;
a self-adhesive back plate disposed on a back surface of the display panel; and
a support plate disposed on a surface of the self-adhesive back plate away from the display panel;
wherein the self-adhesive back plate comprises at least two adhesive layers, one of the at least two adhesive layers is disposed facing the display panel, and another one of the at least two adhesive layers is disposed facing the support plate; and
wherein a material of one of the at least two adhesive layers close to the support plate comprises a light-shielding material.

2. The display module according to claim 1, wherein the self-adhesive back plate comprises a flexible support layer, a first adhesive layer, and a second adhesive layer;
the first adhesive layer is disposed on a surface of the flexible support layer facing the display panel; and
the second adhesive layer is disposed on a surface of the flexible support layer facing the support plate, and a material of the second adhesive layer comprises the light-shielding material.

3. The display module according to claim 2, wherein a material of the flexible support layer comprises at least one of thermoplastic polyester, polyimide, and cycloolefin polymer; and
a material of the first adhesive layer and the material of the second adhesive layer both comprise a pressure-sensitive adhesive material.

4. The display module according to claim 3, wherein the thermoplastic polyester is polyethylene terephthalate.

5. The display module according to claim 1, further comprising:
a light-shielding layer disposed on a surface of the support plate facing the self-adhesive back plate.

6. The display module according to claim 5, wherein a material of the light-shielding layer comprises black toner particles.

7. The display module according to claim 1, wherein a material of the support plate comprises at least one type of metals; and
the metals comprise at least one of aluminum, titanium, nickel, iron, and copper.

8. The display module according to claim 1, wherein a thickness of the support plate ranges from 300 microns to 150 microns.

9. A display device comprising a display module; wherein the display module comprises:
a display panel;
a self-adhesive back plate disposed on a back surface of the display panel; and
a support plate disposed on a surface of the self-adhesive back plate away from the display panel;
wherein the self-adhesive back plate comprises at least two adhesive layers, one of the at least two adhesive layers is disposed facing the display panel, and another one of the at least two adhesive layers is disposed facing the support plate; and
wherein a material of one of the at least two adhesive layers close to the support plate comprises a light-shielding material.

10. The display device according to claim 9, wherein the self-adhesive back plate comprises a flexible support layer, a first adhesive layer, and a second adhesive layer;
the first adhesive layer is disposed on a surface of the flexible support layer facing the display panel; and
the second adhesive layer is disposed on a surface of the flexible support layer facing the support plate, and a material of the second adhesive layer comprises the light-shielding material.

11. The display device according to claim 9, wherein a material of the flexible support layer comprises at least one of thermoplastic polyester, polyimide, and cycloolefin polymer; and
a material of the first adhesive layer and the material of the second adhesive layer both comprise a pressure-sensitive adhesive material.

12. The display device according to claim 11, wherein the thermoplastic polyester is polyethylene terephthalate.

13. The display device according to claim 9, further comprising:
a light-shielding layer disposed on a surface of the support plate facing the self-adhesive back plate.

14. The display device according to claim 13, wherein a material of the light-shielding layer comprises black toner particles.

15. The display device according to claim 9, wherein a material of the support plate comprises at least one type of metals; and
the metals comprise at least one of aluminum, titanium, nickel, iron, and copper.

16. The display device according to claim 9, wherein a thickness of the support plate ranges from 300 microns to 150 microns.

17. The display module according to claim 1, wherein the self-adhesive back plate comprises a flexible support layer, a first adhesive layer, and a second adhesive layer, the first adhesive layer is disposed on a surface of the flexible support layer facing the display panel, and the second adhesive layer is disposed on a surface of the flexible support layer facing the support plate; and
wherein the first adhesive layer is a transparent adhesive layer, the second adhesive layer is a light-shielding adhesive layer, and a material of the light-shielding adhesive layer is the light-shielding material.

18. The display module according to claim 1, wherein the light-shielding material comprise black toner particles.

19. A display module comprising:
a display panel;
a self-adhesive back plate disposed on a back surface of the display panel;
a support plate disposed on a surface of the self-adhesive back plate away from the display panel; and
a light-shielding layer disposed on a surface of the support plate facing the self-adhesive back plate;
wherein the self-adhesive back plate comprises at least two adhesive layers, one of the at least two adhesive layers is disposed facing the display panel, and another one of the at least two adhesive layers is disposed facing the support plate.

20. The display module according to claim 19, wherein a material of the light-shielding layer comprises black toner particles.

\* \* \* \* \*